(12) United States Patent
Moyer et al.

(10) Patent No.: US 7,036,785 B2
(45) Date of Patent: May 2, 2006

(54) CAM ACTIVATED EXTENDABLE CUPHOLDER

(75) Inventors: Scott A. Moyer, Roseville, MI (US); Alan G. Dry, Grosse Pointe Woods, MI (US)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 10/638,882

(22) Filed: Aug. 11, 2003

(65) Prior Publication Data

US 2005/0035254 A1    Feb. 17, 2005

(51) Int. Cl.
*A47K 1/08*    (2006.01)
(52) U.S. Cl. ............... 248/311.2; 248/313; 248/286.1; 224/282; 224/557
(58) Field of Classification Search .......... 248/311.2, 248/313, 286.1, 289.11, 293, 278; 224/282, 224/483, 926, 557; 297/188.14, 188.15, 297/188.16, 188.17
See application file for complete search history.

(56) References Cited

U.S. PATENT DOCUMENTS

| 5,072,989 | A | | 12/1991 | Spykerman et al. |
|---|---|---|---|---|
| 5,330,146 | A | | 7/1994 | Spykerman |
| 5,494,249 | A | * | 2/1996 | Ozark et al. ............. 248/311.2 |
| 5,671,877 | A | * | 9/1997 | Yabuya ..................... 224/282 |
| 5,704,579 | A | | 1/1998 | Celentino et al. |
| 5,762,307 | A | | 6/1998 | Patmore |
| 5,857,633 | A | | 1/1999 | Pelchat, II et al. |
| 5,897,089 | A | * | 4/1999 | Lancaster et al. ........ 248/311.2 |
| 5,988,579 | A | | 11/1999 | Monér, Jr. et al. |
| 6,361,008 | B1 | | 3/2002 | Gravenstreter |
| 6,435,633 | B1 | | 8/2002 | Hoshi |
| 6,550,736 | B1 | | 4/2003 | Schaal |
| 2002/0171018 | A1 | | 11/2002 | Harada |

FOREIGN PATENT DOCUMENTS

| GB | 2 368 567 | 5/2002 |
|---|---|---|
| WO | 2004/022386 | 3/2004 |

* cited by examiner

*Primary Examiner*—Kimberly Wood
(74) *Attorney, Agent, or Firm*—MacMillan, Sobanski & Todd, LLC

(57) ABSTRACT

A vehicle cupholder comprises a generally planar support member that is pivotable about a horizontal axis between a horizontal open position and a vertical stowed position. The support member includes a first curved wall and a first retaining arm retaining a container when in a horizontal open position. A first retaining arm is pivotally mounted to the support member in a plane parallel to the plane of the support member. A first mounting bracket includes a cam-shaped outer perimeter surface in constant contact with first retaining arm. The retaining arm is slideable along the outer perimeter surface between the extended position and the retracted position. The outer perimeter surface exerts a biasing force on the first retaining arm as the support member is pivoted from the horizontal open position to the vertical stowed position so as to pivot the first retaining arm from the extended position to the retracted position.

15 Claims, 3 Drawing Sheets

CAM ACTIVATED EXTENDABLE CUPHOLDER

CROSS REFERENCE TO RELATED APPLICATIONS

Not Applicable.

STATEMENT REGARDING FEDERALLY SPONSORED RESEARCH

Not Applicable.

BACKGROUND OF THE INVENTION

1. Field of the Invention

The present invention relates in general to a cupholder for a container in a vehicle, and more specifically, to a cupholder assembly that is extendable and retractable from a horizontal open position to a vertical stowed position.

2. Description of the Related Art

Typically vehicle cupholders have included a variety of vehicle packaging devices and locations within the interior vehicle space to accommodate retaining a container of a beverage such as a cup. Numerous mechanisms have been incorporated in vehicles to retain cupholders. These mechanisms usually include retractable devices, of types that have required large and deep recess in an interior console compartment to store the cupholder, such an elongated tray that is slidable or foldable and stowed lengthwise into an interior compartment. This requires the interior compartment to include a large packaging compartment to accommodate the device. Compartments such as an interior of an armrest usually contains a large sufficient amount of unused space to accommodate these devices. Such devices often require something other than a simple maneuver on the passengers part to stow or retrieve the cupholder such as opening the armrest lid and folding or unfolding the device and shutting the lid. These and other devices also require the assembly of numerous sub-components to produce the final product. It is important that a cupholder maintain simplicity from a manufacturing and end user perspective and minimize the number of operations for opening and closing of the device as needed, especially for a driver of a vehicle, and yet require a minimum amount of packaging space.

SUMMARY OF THE INVENTION

A cupholder for an interior of a vehicle contains a support member pivotable between a horizontal open position and a vertical stowed position, and a retaining arm that extends when the support member is in the horizontal open position and retracts when in the vertical stowed position and has the advantage of recessing into a shallow housing compartment when in the retracted and vertical stowed position.

A vehicle cupholder comprises a generally planar support member that is pivotable about a horizontal axis. The support member includes a first curved wall on a respective first edge of the support member for receiving a container when in a horizontal open position. The support member is pivotable between the horizontal open position and a vertical stowed position. A first retaining arm is pivotally mounted to the support member at an end of the first curved wall for retaining the container. The first retainer arm is pivotable in a plane parallel to the plane of the support member between an extended position and a retracted position. A hinge couples the support member to a fixed support and the support member is pivotable about the hinge. A first mounting bracket includes a cam-shaped outer perimeter surface in contact with the end surface of the first retaining arm. The end surface is slideable along the outer perimeter surface between the extended position and the retracted position as the support member is pivoted about the hinge between the horizontal open position and the stowed vertical position. The outer perimeter surface exerts a biasing force on the end surface as the support member is pivoted from the horizontal open position to the vertical stowed position, and as a result, the biasing force pivots the first retaining arm from the extended position to the retracted position.

DETAILED DESCRIPTION OF PREFERRED EMBODIMENTS

Figure 1:
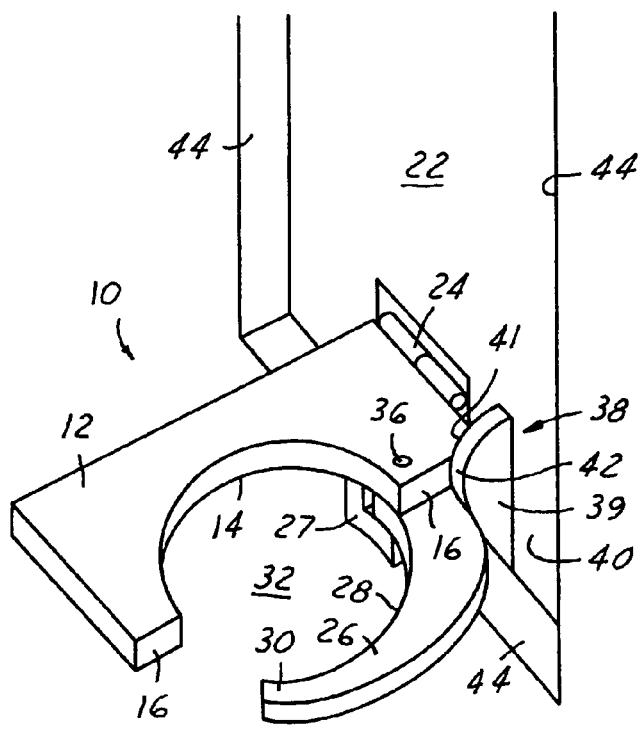
FIG. 1 is a perspective view of a vehicle cupholder in a horizontal open position according to a first preferred embodiment.

Referring now to the Drawings and particularly to FIG. 1, there is shown a vehicle cupholder 10 within the interior of a vehicle according to a preferred embodiment. A generally planar support member 12 is shown in a horizontal open position. The support member 12 includes a first curved wall 14 along a respective first edge 16 for receiving a container. The support member 12 is attached to a fixed support such as a console housing 22 by a hinge system 24. The hinge system 24 shown in this embodiment is a piano-type hinge. Alternatively, other types of hinged or pivoting systems such as surface-mount hinges, butt hinges, pinless hinges, plastic molded hinges, or plastic folding hinges known in the art can be used. The support member 12 is pivotable about the hinge system 24 from a horizontal open position to a vertical stowed position. The support member 12 includes an L-shape wall 27 integrally attached to and extending along a bottom surface of the support member 12 and between an end of the first curved wall 14 and an end of the support member 12 which the hinge system is attached to.

A first retaining arm 26 is pivotably secured to the support member 12 by a pivot body 36 located between the generally planar support member 12 and the L-shape wall 27. The first retaining arm 26 is in a plane that is parallel to the support member 12 and maintains the parallel plane when the support member 12 is in either the horizontal open position or the vertical stowed position. The first retaining arm 26 includes an arc shaped edge 28 facing the first curved surface 14. A distal end 30 of the first retaining arm 26 pivots toward the first curved wall 14 as the first retaining arm 26 moves to a retracted position, and alternatively, pivots away from the first curved wall 14 as the first retaining arm 26 is moved to an extended position. When the first retaining arm 26 is in the extended position, the first edge 16 and the arc shaped edge 28 form an aperture or a cup well 32 for receiving and supporting the container.

A spring 34 such as a torsion spring (shown in FIGS. 6a and 6b) is mounted about a pivot body 36. Each respective leg of the spring 34 is positioned so as to contact an adjacent wall of the L-shaped wall 27 and the first retaining arm 26. When the first retaining arm 26 is brought into the retracted position, a torsion force is placed on the spring 34 and upon release of a resistance force maintaining the retracted position, the spring will retract to force the first retaining arm 26 to the extended position.

Figure 2:
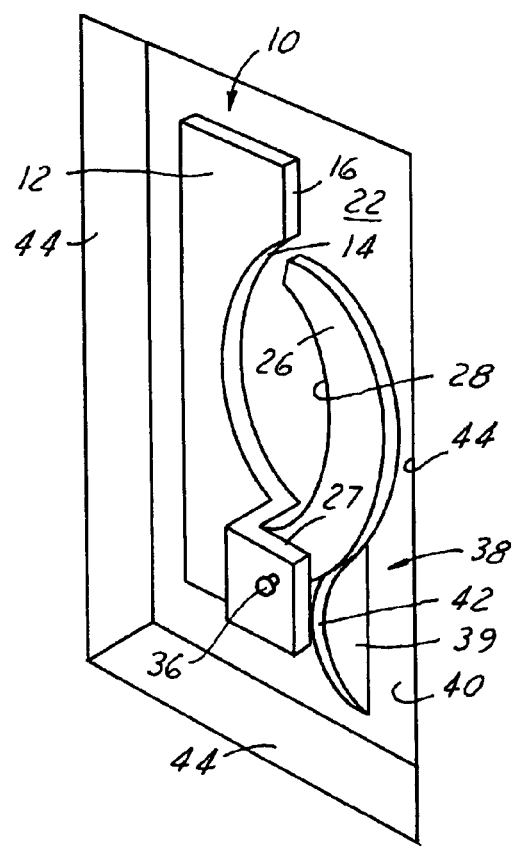
FIG. 2 is a perspective view of a vehicle cupholder in vertical stowed position according to a first preferred embodiment.

A first mounting bracket 38 is attached to a mounting surface 40 of the console housing 22 at a lower or bottom portion of the console housing 22. The first mounting bracket 38 has two respective sides 39, 41 which are generally flat and are perpendicular to the mounting surface 40. The first mounting bracket 38 is positioned adjacent to the respective edge 16. The first mounting bracket 38 includes a cam-shaped outer perimeter 42 on an outer edge surface located between to the two respective sides 39, 41, which functions as a cam. An imaginary line extending from the horizontal axis of the hinge system 24 to a perpendicular intersection with the first mounting bracket 38 forms a radial point. As shown in FIGS. 1 and 2 the outer perimeter is a curved surface. A radius from the radial point to the outer perimeter 42 increases as the outer perimeter 42 is extended upward and away from the radial point.

The first retaining arm 26 is in substantially constant contact with the first mounting bracket 38 between the open horizontal position and the vertical stowed position. When the support member 12 is in the horizontal open position, the first retaining arm 26 is fully extended in the extended position and is seated against the cam-shaped outer perimeter 42 in a lower portion of the first mounting bracket 38. As the support member 12 is pivoted between the horizontal open position and vertical stowed position, the first retaining arm 26 is slideable against the outer perimeter 42. As the support member 12 is pivoted in the direction of the vertical stowed position, the cam-shaped outer perimeter exerts a biasing force on the on the first retaining arm 26 and forces the distal end 30 of the first retaining arm 26 to pivot inward toward the support member 12 to the retracted position. The cam-shaped outer perimeter maintains a constant force in collapsing the first retaining arm 26 to the retracted position. The force created by the cam-shaped outer perimeter 42 is in resistance to the torsion force generated by the spring 34.

FIG. 2 illustrates the vehicle cupholder 10 in the vertical stowed position. When the vehicle cupholder 10 is in the vertical stowed position, the first retaining arm 26 is fully retracted in the retracted position. The upper portion of the cam-shaped outer perimeter 42 maintains the retracted position of the first retaining arm 26. The first retaining arm 26 is retracted to a position such that the vehicle cupholder 10 fully recesses within the console housing 22 when in the vertical stowed position. The spring 34 (shown in FIG. 1) maintains an increased torsion force between the support member 12 and the first retaining arm 26 when the vehicle cupholder is at the vertical stowed position. When the vehicle cupholder 10 is to be used, the support member 12 is pivoted downward from the vertical stowed position to the horizontal open position. As the support member 12 is pivoted downward about the horizontal axis, the biasing force exerted on the first retaining arm 26 by the first mounting bracket 38 is reduced as the first retaining arm 26 follows a receding cam-shaped outer perimeter 42. The torsion force maintained by the spring forces the first retaining arm 26 to follow a contour of the cam-shaped outer perimeter thereby allowing the first retaining arm 26 to move outward from the first curved wall 14 to the extended position. As the vehicle cupholder reaches the horizontal open position, the first retaining arm 26 fully extends to the extended position.

Figure 3:
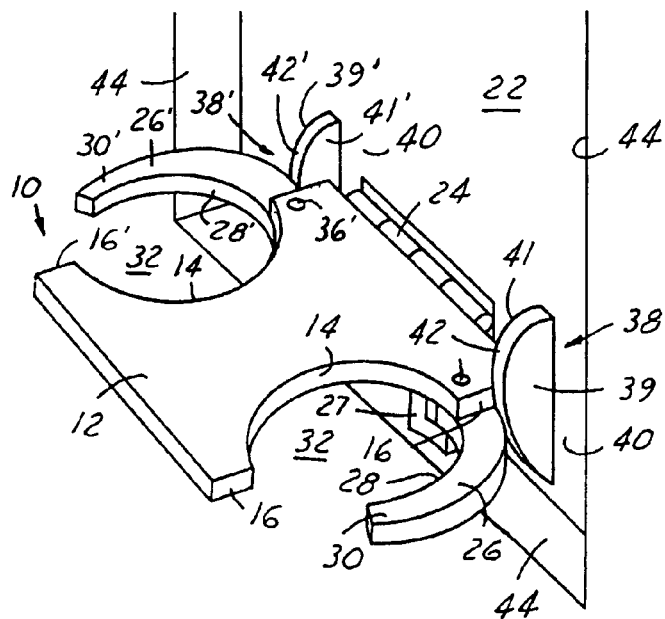
FIG. 3 is a perspective view of a vehicle cupholder in a horizontal open position according to a second preferred embodiment.

FIG. 3 illustrates a vehicle cupholder according to a second preferred embodiment. The second preferred embodiment incorporates a second cupholder. It can well appreciated that the inclusion of components of the second cupholder is a mirror image of the components of the first preferred embodiment and function in an identical manner as described in FIGS. 1 and 2. The mirror image components are designated with the same number as their mirror image counterpart including a prime.

Figure 4:
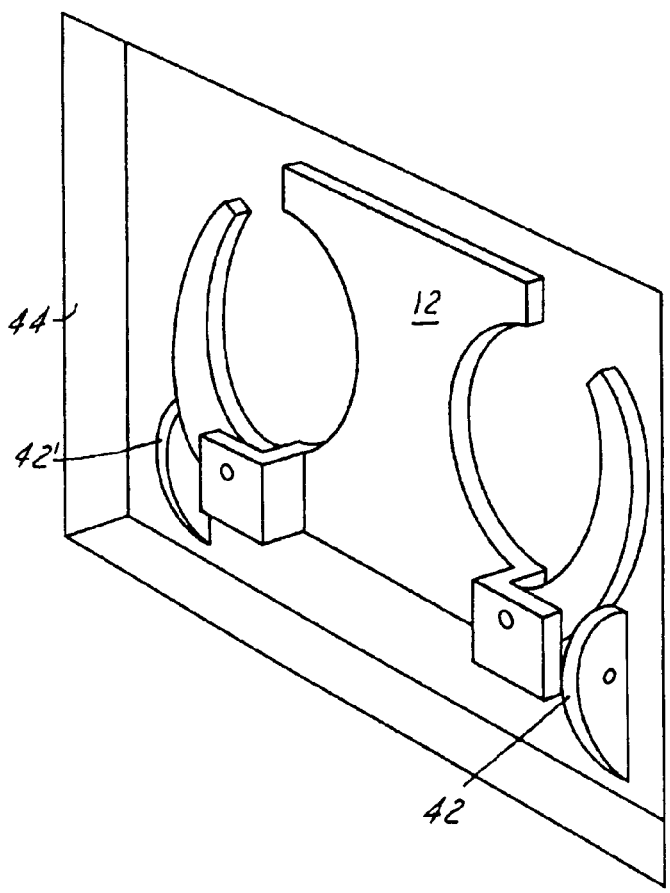
FIG. 4 is a perspective view of a vehicle cupholder in a vertical stowed position according to a second preferred embodiment.

FIG. 4 illustrates the vehicle cupholder in a vertical stowed position according to the second preferred embodiment.

Figure 5:
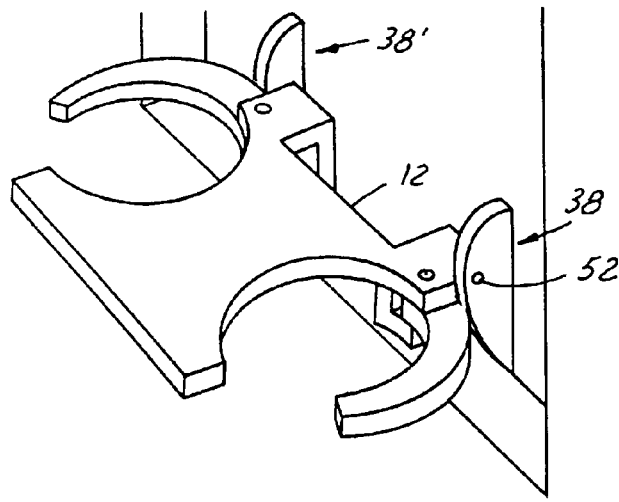
FIG. 5 is a perspective view of a vehicle cupholder illustrating a hinge system according to a third preferred embodiment.
Figure 6A:
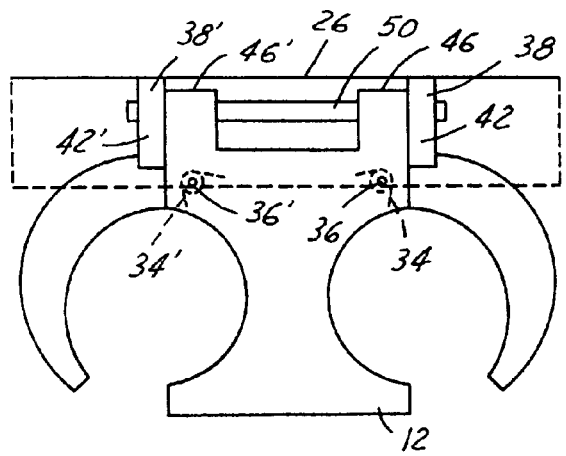
FIGS. 6a and 6b is a top view of a vehicle cupholder illustrating the hinge system according to the third preferred embodiment.
Figure 6B:
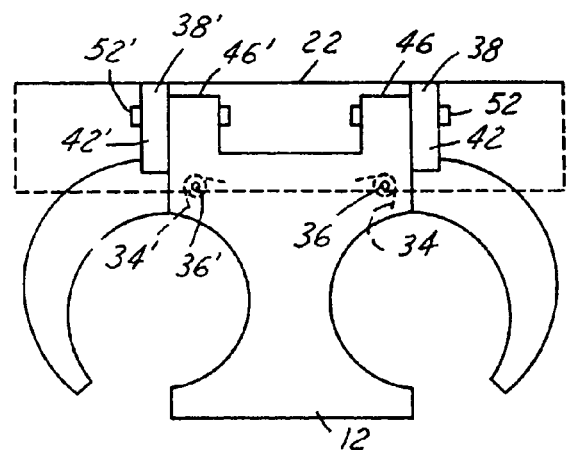

FIG. 5 illustrates a perspective view of a cupholder including a second hinge system according to a third preferred embodiment. The support member 12 is pivotably hinged to mounting brackets 38, 38' as opposed to directly mounting the support member 12 to the console housing 22 (as in FIG. 1). FIGS. 6a and 6b illustrate a top view of the second hinge system more clearly and depict the interaction and attachment between the support member 12 and the mounting brackets 38, 38'.

FIG. 6a shows the first and second mounting bracket 38, 38' mounted to the console housing 22. The support member 12 includes pivot supports 46, 46'. The pivot supports are bosses integrally attached to the support member 12. The second hinge system 48 includes a common pivot member 50 pivoting about the horizontal axis and extending through the mounting brackets 38, 38' and pivot supports 46, 46'. The support member 12 is hingedly attached to the mounting brackets 38, 38' by the common pivot member 50. As in the preferred embodiment, when the support member 12 pivots about the horizontal axis, namely the common pivot member 50, the cam-shaped outer perimeter 42, 42' of the mounting brackets 38, 38' exert a force on the first and second retaining arm 26, 26' forcing the first and second retaining arm 26, 26' to retract as the vehicle cupholder 10 is pivoted from the horizontal open position to the vertical stowed position. Alternatively, support member 12 of FIG. 1 could have been utilized in this embodiment instead of the pivot supports 46, 46'. A single through-hole could be incorporated in the support member 12 to support the common pivot member 50.

FIG. 6b illustrates a modification to the second hinge system. The support member 12 is pivoted about a horizontal axis, however, a first and second pivot member 52, 52' is used as opposed to a common pivot member as in FIG. 6a. The first pivot member 52 hingedly attaches pivot support 46 to mounting bracket 38, and second pivot member 52' hingedly attaches pivot support 46' to mounting bracket 38'. Both pivot members 52, 52' share the horizontal axis.

From the foregoing description, one ordinarily skilled in the art can easily ascertain the essential characteristics of this invention and, without departing from the spirit and scope thereof, can make various changes and modifications to the invention to adapt it to various usages and conditions. For example, the pivot members of the second preferred embodiment could be used with the first hinge for pivoting the vehicle cupholder from a horizontal open position to a vertical stowed position.

What is claimed is:

1. A vehicle cupholder comprising:
 a generally planar support member pivotable about an axis including a first curved wall on a respective first edge of said support member for receiving a container when in an open position, said support member being pivotable between said open position and a stowed position;
 a first retaining arm pivotally mounted to said support member at an end of said first curved wall for retaining said container, said first retainer arm being pivotable in a plane parallel to the plane of said support member between an extended position and a retracted position;
 a hinge for coupling said support member to a fixed support, said support member being pivotable about said hinge;
 a first mounting bracket, said first mounting bracket includes a curved cam-shaped outer perimeter surface in contact with an end surface of said first retaining arm, said end surface being slideable along said cam-shaped outer perimeter surface between said extended position and said retracted position as said support member is pivoted about said hinge between said open position and said stowed position; and
 wherein said cam-shaped outer perimeter surface engages said end surface as said support member is pivoted from said open position to said stowed position whereby said first retaining arm pivots from said extended position to said retracted position and said cam-shaped outer perimeter maintains said retracted position of said first retaining arm.

2. The vehicle cupholder of claim 1 further comprising: a second curved wall on a respective second edge of said support member for receiving a second container when in said open position;
 a second retaining arm pivotally mounted to an end of said second curved wall for retaining said second container, said second retaining arm being pivotable about said hinge between an extended position and a retracted position; and
 a second mounting bracket, said second mounting bracket includes a cam-shaped outer perimeter surface in contact with an end surface of said second retaining arm, wherein said end surface of said second retaining arm being slideable along said cam-shaped outer perimeter surface of said second mounting bracket between said extended position and said retracted position as said support member is pivoted about said second pivot member between said open position and said stowed position; and
 wherein said cam-shaped outer perimeter surface engages said end surface of said second retaining arm as said support member is pivoted from said open position to said stowed position whereby said second retaining arm pivots from said extended position to said retracted position and said cam-shaped outer perimeter maintains said retracted position of said second retaining arm.

3. The vehicle cupholder of claim 2 further comprising at least one spring for biasing said first and second retaining arms laterally outward into said extended position as said support member is pivoted from said stowed position to said open position.

4. The vehicle cupholder of claim 2 wherein said at least one spring includes a torsion spring.

5. The vehicle cupholder of claim 1 wherein said first and second shaped mounting bracket is attached to a console unit.

6. The vehicle cupholder of claim 1 wherein said first and second mounting bracket is integral to a console unit.

7. The vehicle cupholder of claim 1 wherein said hinge is integrated in said first and second mounting bracket.

8. The vehicle cupholder of claim 7 wherein said hinge includes a common pivot member for pivoting said support member, said common pivot member having a first end and a second end, wherein said common pivot member is pivotably attached to said first mounting bracket at said first end of said common pivot member and pivotably attached to said second mounting bracket at said second end of said common pivot member.

9. The vehicle cupholder of claim 7 wherein said hinge includes a first pivot member pivotably attached to said first mounting bracket and a second pivot member pivotably attached to said second mounting bracket for pivoting said support member.

10. A vehicle cupholder assembly comprising:
 a housing console located within a console unit;
 a generally planar support member including a first curved wall on a respective first edge of said support member and a second curved wall on a respective second edge of said support member for receiving a container when in a open position, said support member being pivotable between said open position and a stowed position, said stowed position is positioned with said housing console;
 a first retaining arm pivotally mounted to a support member at an end of said first curved wall for retaining said container, a second retaining arm pivotally mounted to said support member at an end surface of said second curved wall for retaining said container, said first retaining arm and said second retaining arm being pivotable in a plane parallel to the plane of said support member between an extended position and a retracted position;
 a first mounting bracket, said first mounting bracket includes a curved cam-shaped outer perimeter surface in contact with said end of said first retaining arm, said end surface being slideable along said cam-shaped outer perimeter surface between said extended position and said retracted position as said support member is pivoted about said hinge between said open position and said stowed position;

a second mounting bracket, said second mounting bracket includes a curved cam-shaped outer perimeter surface in contact with an end surface of said second retaining arm, wherein said end surface of said second retaining arm being slideable along said cam-shaped outer perimeter surface of said second mounting bracket between said extended position and said retracted position as said support member is pivoted about said second pivot member between said open position and said stowed position;

said housing console suitable for receiving said support member and said first and second retaining arm when in said stowed position; and wherein said cam-shaped outer perimeter surface of said first and second mounting bracket each engage said end surface of said first and second retaining arm as said support member is pivoted from said open position to said stowed position whereby said first and second retaining arm pivot from said extended position to said retracted position and said cam-shaped outer perimeter maintains said retracted position of said first and second retaining arms.

11. The vehicle cupholder of claim 1 wherein an upper surface of said cam-shaped outer perimeter maintains said retracted position of said retaining arm.

12. The vehicle cupholder assembly of claim 10 wherein an upper surface of said cam-shaped outer perimeter maintains said retracted position of said first and second retaining arms.

13. The vehicle cupholder of claim 1 wherein an imaginary line extending from said hinge to a perpendicular intersection with said mounting bracket forms a radial point, a radius from said radial point to said cam-shaped outer perimeter increases as said cam-shaped outer perimeter is extended upward and away from the radial point.

14. The vehicle cupholder of claim 10 wherein an imaginary line extending from said hinge to a perpendicular intersection with said mounting bracket forms a radial point, a radius from said radial point to said cam-shaped outer perimeter increases as said cam-shaped outer perimeter is extended upward and away from the radial point.

15. The vehicle cupholder of claim 1 further comprising at least one spring for biasing said first retaining arm laterally outward into said extended position as said support member is pivoted from said stowed position to said open position.

* * * * *